United States Patent [19]

Bailey

[11] Patent Number: 5,451,892
[45] Date of Patent: Sep. 19, 1995

[54] CLOCK CONTROL TECHNIQUE AND SYSTEM FOR A MICROPROCESSOR INCLUDING A THERMAL SENSOR

[75] Inventor: Joseph A. Bailey, Austin, Tex.

[73] Assignee: Advanced Micro Devices, Sunnyvale, Calif.

[21] Appl. No.: 317,719

[22] Filed: Oct. 3, 1994

[51] Int. Cl.$^6$ .................. G01R 25/00; H03K 4/06
[52] U.S. Cl. ................... 327/113; 327/8; 327/47; 327/83; 327/138; 327/291; 327/513
[58] Field of Search .............. 327/8, 47, 83, 138, 327/291, 513, 113

[56] References Cited

U.S. PATENT DOCUMENTS

| | | | |
|---|---|---|---|
| 5,189,314 | 2/1993 | Georgiou et al. | 327/513 |
| 5,300,836 | 4/1994 | Cha | 327/113 |
| 5,359,234 | 10/1994 | Atriss et al. | 327/513 |

*Primary Examiner*—Margaret Rose Wambach
*Attorney, Agent, or Firm*—Conley, Rose & Tayon

[57] ABSTRACT

A clock control circuit is provided to control the frequency of a microprocessor clock signal and includes a clock management unit which controls the frequency of a timing signal applied to a clock generator and distribution unit, which correspondingly supplies an internal clock signal to a CPU core of the microprocessor. A thermal sensor is integrated with the semiconductor die which forms the microprocessor circuit. An output signal from the thermal sensor is provided to a primary temperature indicator unit and to an auxiliary temperature indicator unit. The primary temperature indicator unit is configured to assert a primary indicator signal when the temperature of the semiconductor die has increased above a first threshold level referred to as the primary threshold level, and the auxiliary temperature indicator unit is configured to assert an auxiliary indicator signal when the temperature of the semiconductor die exceeds yet a second threshold level referred to as the auxiliary threshold level. The primary and auxiliary threshold levels may be set by writing to a programmable registers unit. The primary and auxiliary temperature indicator unit are associated with hysteresis characteristics whereby, once either indicator signal has been asserted, it will not be deasserted until a hysteresis point is reached.

20 Claims, 2 Drawing Sheets

CLOCK CONTROL TECHNIQUE AND SYSTEM FOR A MICROPROCESSOR INCLUDING A THERMAL SENSOR

BACKGROUND OF THE INVENTION

1. Field of the Invention

This invention relates to microprocessors and more particularly to mechanisms and techniques for dynamically managing the internal clock speed of a microprocessor to enhance performance while preventing overheating.

2. Description of the Relevant Art

The frequency of a microprocessor clock signal is an important determinant with respect to the overall performance of a computer system. In general, as the speed of a microprocessor clock signal increases, the time required to execute various instructions decreases. Thus, microprocessors which are capable of running at relatively high internal clock frequencies are desirable for high performance and computational intensive applications.

Unfortunately, the frequency at which a microprocessor clock signal may be driven is limited. In general, as the frequency of the microprocessor clock signal is increased, the amount of heat generated by the microprocessor circuit also increases. If the temperature of the microprocessor chip exceeds a certain threshold, failures may occur. To complicate matters further, the threshold temperature at which a failure may occur in a microprocessor typically depends upon the current operating frequency. Therefore, manufacturers typically rate a microprocessor to run at some predetermined maximum frequency during which the system is guaranteed to operate properly. This predetermined maximum frequency is usually specified to account for worst-case conditions including worst-case ambient temperatures. However, since the conditions during which a microprocessor normally operates are typically better than worst-case, the rated predetermined maximum frequency may be significantly less than the frequency at which the microprocessor could actually be driven. As a result, the overall performance of the computer system may be unnecessarily degraded.

SUMMARY OF THE INVENTION

The problems outlined above are in large part solved by a clock control technique and system for a microprocessor in accordance with the present invention. In one embodiment, a clock control circuit includes a clock management unit which controls the frequency of a timing signal applied to a clock generator and distribution unit. The clock generator and distribution unit supplies an internal clock signal to a CPU core of the microprocessor. In one specific implementation, the clock management unit controls the frequency of the timing signal by selectively controlling a phase locked looped circuit and an associated divider circuit. A thermal sensor is integrated with the semiconductor die which forms the microprocessor circuit. An output signal from the thermal sensor is provided to a primary temperature indicator unit and to an auxiliary temperature indicator unit. The primary temperature indicator unit is configured to assert a primary indicator signal when the temperature of the semiconductor die has increased above a first threshold level referred to as the primary threshold level, and the auxiliary temperature indicator unit is configured to assert an auxiliary indicator signal when the temperature of the semiconductor die exceeds yet a second threshold level referred to as the auxiliary threshold level. The primary and auxiliary threshold levels may be set by writing to a programmable registers unit. The primary temperature indicator unit is associated with a hysteresis characteristic whereby, once the primary indicator signal has been asserted, it will not be deasserted until the temperature of the semiconductor die has fallen below a predetermined hysteresis point. The auxiliary temperature indicator unit is similarly associated with a hysteresis characteristic whereby, once the auxiliary indicator signal has been asserted, it will not be deasserted until the temperature of the semiconductor die has fallen below a second predetermined hysteresis point.

During operation of the microprocessor, an external clock signal having a frequency of, for example, 33 MHz may be provided to an input of the phase locked loop circuit. The clock management unit initially causes the phase locked loop circuit to multiply the frequency of the external clock signal by a factor of three and causes the divider circuit to divide the output signal of the phase locked loop circuit by a divisor of two. A timing signal having a frequency of 49.5 MHz is thus established, and the CPU core is correspondingly driven at 49.5 MHz. The clock management unit continuously or periodically monitors the primary and auxiliary indicator signals to determine whether the frequency of the internal timing signal should be changed. If neither the primary indicator signal nor the auxiliary indicator signal are asserted, the clock management unit causes the frequency of the timing signal to increase to thereby increase the CPU core frequency. For example, the clock management unit may cause the frequency of the timing signal to increase to 66 MHz by causing the phase locked loop circuit to multiply the frequency of the external clock signal by a factor of two and by setting the divider circuit to divide the output signal of the phase locked loop circuit by a divisor of one. The clock management unit remains in this state until the auxiliary indicator signal is asserted, which indicates that the semiconductor die temperature has risen above the auxiliary threshold temperature. The clock management unit responsively causes the frequency of the timing signal to be reduced back to 49.5 MHz. Once the auxiliary indicator signal has been asserted, it will not be deasserted until the temperature of the semiconductor falls below the hysteresis point associated with the auxiliary threshold temperature.

If the temperature of the semiconductor die increases above the primary threshold temperature, the primary temperature indicator unit asserts the primary indicator signal. The clock management unit responsively causes the frequency of the timing signal to decrease to thereby decrease the CPU core frequency. The clock management unit may cause the frequency of the timing signal to decrease to, for example, 33 MHz, by setting the phase locked loop circuit such that it multiplies the frequency of the external clock signal by a factor of one. The primary indicator signal remains asserted until the temperature of the semiconductor die falls below the hysteresis point associated with the primary threshold temperature. When the primary temperature indicator signal is deasserted, the clock management unit again causes the timing signal to be set at 49.5 MHz.

In one implementation, the primary and auxiliary threshold levels, along with their respective hysteresis points, may be programmed by writing to a configuration registers unit. In addition, in one implementation, the clock management unit causes the external clock signal to be passed directly to the clock generator and distribution unit when a change in the output frequency of the phase locked loop circuit is to occur. The clock management unit causes the external clock signal to be passed directly to the clock generator and distribution unit until the phase locked loop circuit has locked, whereupon the clock management unit allows the timing signal to be derived from the output signal of the phase locked loop circuit.

A clock control circuit in accordance with the present invention advantageously allows the frequency of the internal CPU clock signal to be dynamically adjusted based on current operating conditions, thereby allowing the operating frequency of the microprocessor to be increased during favorable operating conditions. The clock control circuit further prevents failures due to overheating during less favorable operating conditions.

Broadly speaking, the present invention contemplates a clock control circuit for providing a timing signal that controls an internal clock frequency of a microprocessor. The clock control circuit comprises a frequency control circuit configured to selectively vary a frequency of the timing signal depending upon a control signal, a thermal sensor capable of providing a temperature signal indicative of a temperature associated with the microprocessor, and a primary temperature indicator unit coupled to the thermal sensor. The primary temperature indicator unit is capable of asserting a primary indicator signal if the temperature signal exceeds a first predetermined threshold level. The clock control circuit further comprises an auxiliary temperature indicator unit coupled to the thermal sensor and capable of asserting an auxiliary indicator signal if the temperature signal exceeds a second predetermined threshold level, and a clock management unit coupled to receive the primary indicator signal and the auxiliary indicator signal, and coupled to the frequency control circuit. The clock management unit is configured to vary the control signal to thereby cause a change in the frequency of the timing signal in response to assertions of the primary indicator signal and the auxiliary indicator signal.

The invention further contemplates a method for controlling a frequency of an internal clock signal which drives a microprocessor comprising the steps of generating a temperature signal indicative of a temperature associated with the microprocessor, comparing the temperature signal with a first predetermined threshold level, and asserting a primary indicator signal if the temperature signal exceeds the first predetermined threshold level. The method comprises the further steps of comparing the temperature signal with a second predetermined threshold level, asserting an auxiliary indicator signal if the temperature signal exceeds the second predetermined threshold level, decreasing a frequency of the internal clock signal if the primary indicator signal is asserted, and increasing the frequency of the internal clock signal if neither the primary indicator signal nor the auxiliary indicator signal are asserted.

BRIEF DESCRIPTION OF THE DRAWINGS

Other objects and advantages of the invention will become apparent upon reading the following detailed description and upon reference to the accompanying drawings in which.

Figure 1:
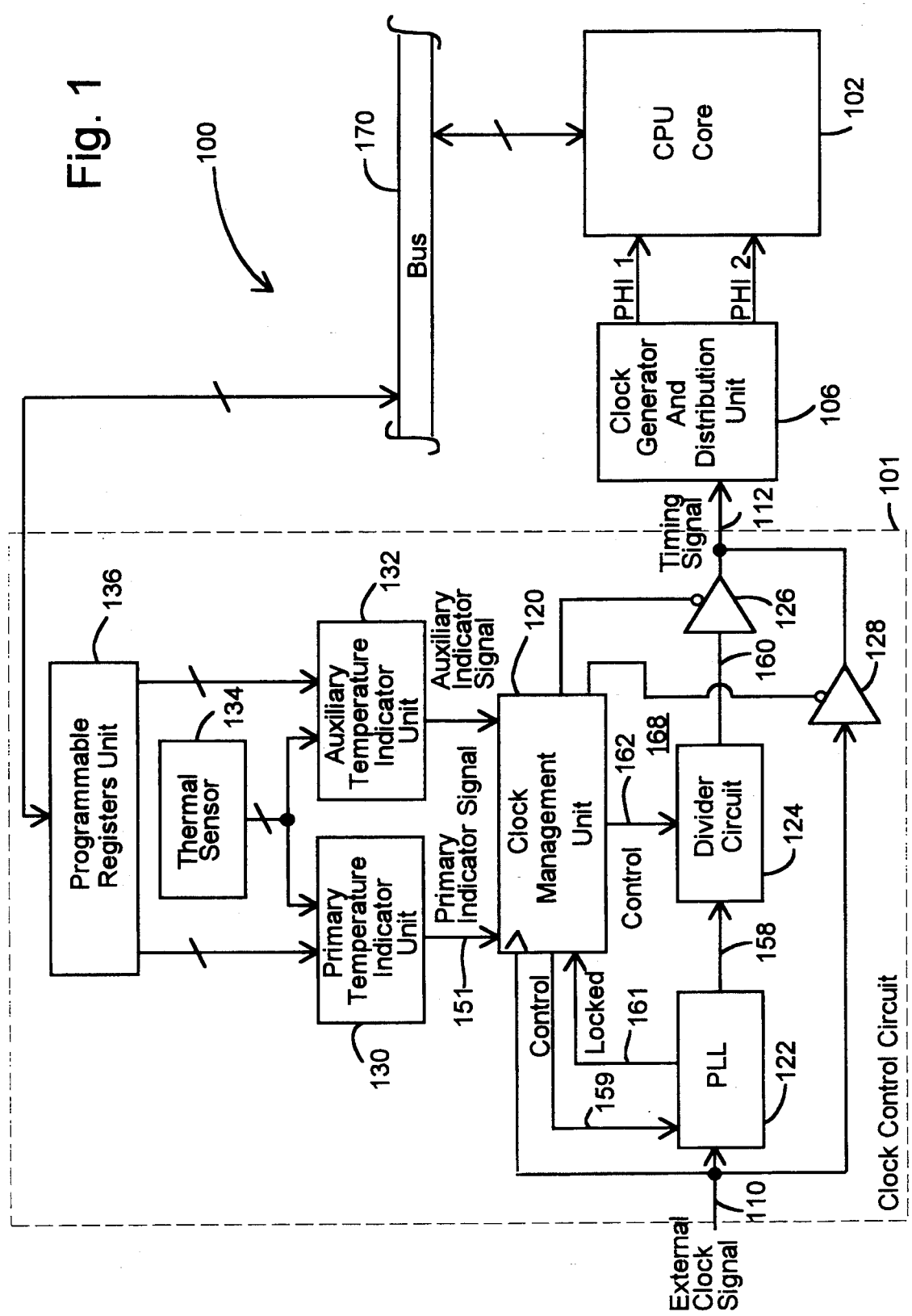
FIG. 1 is a block diagram of a microprocessor including a clock control circuit in accordance with one embodiment of the present invention.

While the invention is susceptible to various modifications and alternative-forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of a microprocessor 100 including a clock control circuit 101 in accordance with one embodiment of the present invention. As illustrated in the figure, microprocessor 100 includes a CPU core 102 coupled to clock control circuit 101 through a clock generator and distribution unit 106. The clock control circuit 101 receives an external clock signal at a line 110 and provides a timing signal to clock generator and distribution unit 106 at line 112.

The clock control circuit 101 includes a clock management unit 120 coupled to a phase locked loop (PLL) circuit 122, to a clock divider circuit 124, and to a pair of three-state drivers 126 and 128. The clock management unit is further coupled to a primary temperature indicator unit 130 and to an auxiliary temperature indicator unit 132. A thermal sensor 134 and a programmable registers unit 136 are finally coupled to primary temperature indicator unit 130 and auxiliary temperature indicator unit 132.

CPU core 102 is a processing unit that implements a predetermined instruction set. Exemplary CPU cores include a model 80486 processor core, among others. Details regarding such exemplary CPU cores are well-known in the art and are described in a host of publications.

Clock generator and distribution unit 106 is provided for generating and distributing an internal clock signal to various circuitry within CPU core 102. It is noted that in the embodiment of FIG. 1, both a phase 1 internal clock signal (PHI1) and a phase 2 internal clock signal (PHI2) are provided to CPU core 102 (i.e., wherein the signal PHI1 is 180° phase shifted from the signal PHI2). A variety of configurations and specific implementations of clock generator and distribution unit 106 are also well known.

Thermal sensor 134 is a thermal sensing circuit that generates an output signal indicative of temperature. In the preferred embodiment, thermal sensor 134 provides a multi-bit digital signal to primary temperature indicator unit 130 and to auxiliary temperature indicator unit 132 which is indicative of the temperature of the semiconductor die on which microprocessor 100 is fabricated. It is specifically contemplated, however, that thermal sensor 134 could alternatively provide an analog output signal indicative of temperature.

Clock management unit 120 is a state machine configured to control the frequency of the timing signal to clock generator and distribution unit 106 depending upon a primary indicator signal and an auxiliary indicator signal at lines 150 and 152, respectively. Specific details regarding the operation of clock management unit 120 will be provided further below.

Phase locked loop circuit 122 receives the external clock signal at line 110 and synthesizes an output signal at line 158. The frequency of the output signal from phase locked loop circuit 122 at line 158 is controlled by a control signal at line(s) 159 generated by clock management unit 120. The phase locked loop circuit 122 is further configured to generate a status signal labeled "locked" at line 161 which is asserted when the output signal at line 158 has stabilized (i.e., locked).

Clock divider circuit 124 selectively divides the frequency of the output signal at line 158 and provides a corresponding output signal at line 160. The clock divider circuit 124 receives a control signal at line(s) 162 from clock management unit 120 which controls the divisor value.

Phase locked loop circuit 122, clock divider circuit 124, and three-state buffers 126 and 128 collectively form a frequency control circuit 168 that varies the frequency of the timing signal at line 112 based on control signals from clock management unit 120. In the embodiment of FIG. 1, phase locked loop circuit 122 is a digital phase locked loop circuit.

Primary temperature indicator unit 130 is a comparator circuit for comparing the digital output signal of thermal sensor 134 to a predetermined threshold value referred to as the primary threshold level. In the preferred embodiment, the primary threshold level is programmable within programmable registers unit 136 through a bus 170. The primary temperature indicator unit 130 is configured to assert the primary indicator signal at line 150 if the semiconductor die temperature as indicated by the output signal of thermal sensor 134 exceeds the primary threshold level. The primary temperature indicator unit 130 is further associated with a hysteresis characteristic whereby, once the primary indicator signal has been asserted, it will not be deasserted until the temperature of the semiconductor die drops below a predetermined hysteresis point. It is noted that in the preferred embodiment this hysteresis point is also programmable within programmable registers unit 136.

For example, the programmable registers unit 136 may be programmed with a value such that the primary temperature indicator unit 130 will assert the primary indicator signal if the semiconductor die exceeds 120° C. The primary temperature indicator unit 130 will thus compare the digital output from thermal sensor 134 and, if the digital output signal indicates a temperature above 120° C., the primary temperature indicator unit 130 will assert the primary indicator signal at line 150. The hysteresis point associated with the primary temperature indicator unit 130 may be set with a value which is effectively 5° below the primary threshold level. Thus, the primary temperature indicator unit 130 will not deassert the primary indicator signal until the temperature of the semiconductor die falls below 115° C.

The auxiliary temperature indicator unit 132 is similarly configured. The auxiliary temperature indicator unit 132 is a comparator circuit for comparing the digital output signal of thermal sensor 134 to a second predetermined threshold value referred to as the auxiliary threshold level. It is noted that the auxiliary threshold level will typically be set such that the auxiliary indicator signal will be asserted at a temperature which is lower than the temperature at which the primary temperature indicator unit 130 asserts the primary indicator signal. In the preferred embodiment, the auxiliary threshold level of the auxiliary temperature indicator unit 132 is programmable through programmable registers unit 136. The auxiliary temperature indicator unit 132 is configured to assert the auxiliary indicator signal at line 152 if the semiconductor die temperature exceeds the auxiliary threshold level. The auxiliary temperature indicator unit 132 is further associated with a hysteresis characteristic whereby, once the auxiliary indicator signal has been asserted, it will not be deasserted until the temperature of the semiconductor die drops below a predetermined hysteresis point. It is noted that in the preferred embodiment this hysteresis point is also programmable within programmable registers unit 136.

Figure 2:
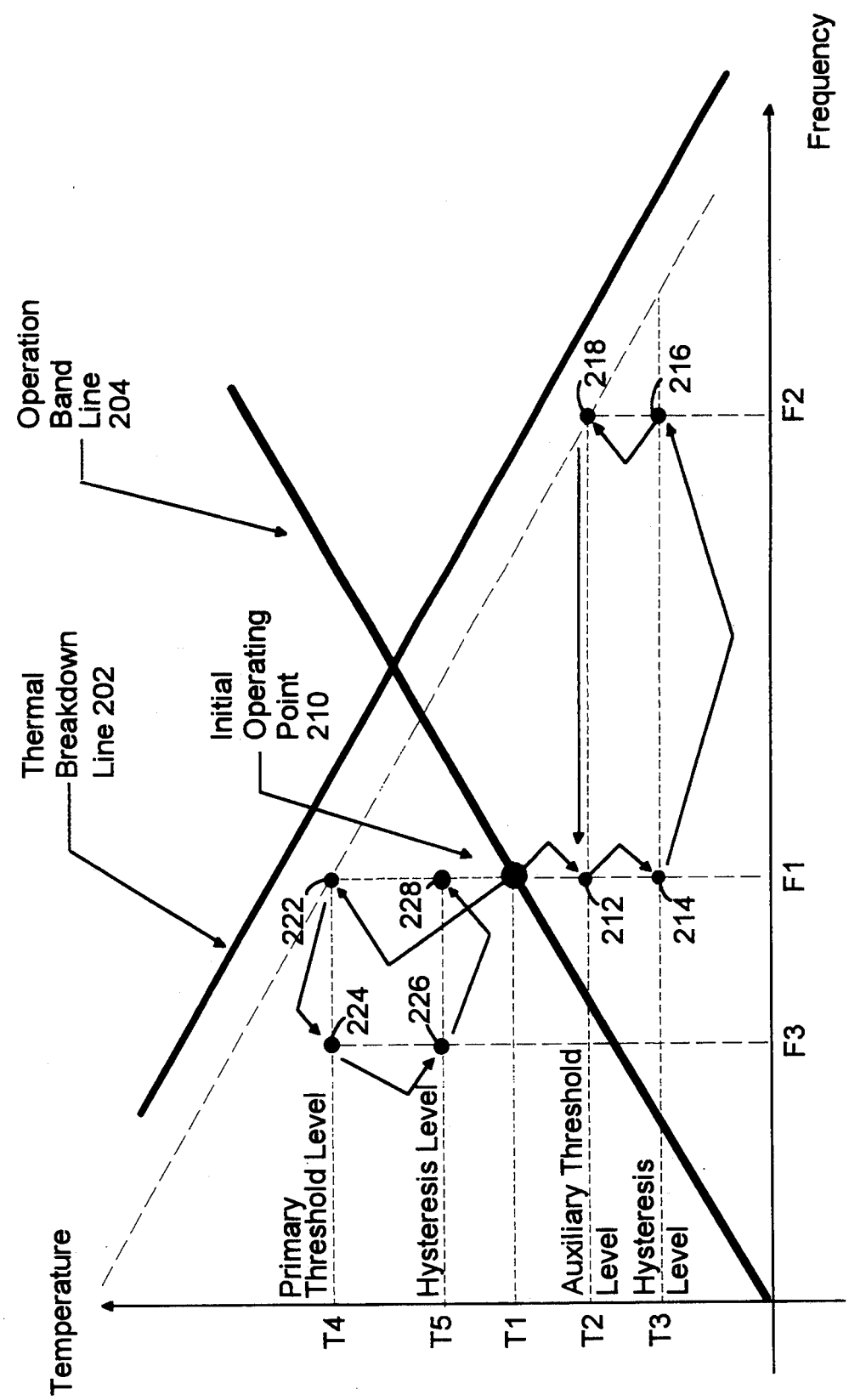
FIG. 2 is a thermal diagram which illustrates operation of the clock control circuit of FIG. 1.

The operation of the clock control circuit 101 of FIG. 1 will next be described in conjunction with the thermal diagram of FIG. 2. FIG. 2 illustrates several generalized characteristics associated with microprocessor 100. One generalized characteristic depicted within FIG. 2 is a thermal breakdown line 202 which represents the semiconductor die temperature for a given frequency within a range of frequencies at which the microprocessor 100 will fail. It is noted that as the frequency of the microprocessor 100 increases, the thermal breakdown temperature decreases.

FIG. 2 also illustrates an operation band line 204 which generally depicts the temperature at which the microprocessor 100 will stabilize (i.e., in steady state) for a given frequency. The operation band line 204 is depicted for a specific implementation wherein a given set of parameters such as package type, process technology, ambient temperature, and system implementation (i.e., cooling fans, thermal planes, etc.) are assumed. It is noted that as the frequency increases, the steady-state temperature of microprocessor 100 also increases. It is also noted that the position or the slope of the operation band line 204 may vary depending upon the particular operational parameters associated with microprocessor 100.

Several temperature levels associated with microprocessor 100 are also illustrated in FIG. 2. A temperature T1 represents a normal operating temperature of microprocessor 100 during steady state conditions. A temperature T2 represents the temperature at which the auxiliary indicator signal will be asserted by the auxiliary temperature indicator unit 132, and a temperature T3 represents the hysteresis level at which the auxiliary indicator signal will be deasserted by auxiliary temperature indicator unit 132 following its assertion. A temperature T4 represents the temperature at which the primary temperature indicator unit 130 will assert the primary indicator signal, and the temperature T5 represents the hysteresis level at which the primary indicator signal will be deasserted by the primary temperature indicator unit 130.

Referring collectively to FIGS. 1 and 2, upon system reset, the clock control circuit 101 receives the external clock signal at line 110. In one embodiment, the external clock signal is characterized with a frequency of 33 MHz. Phase locked loop circuit 122 is initially set by clock management unit 120 via the control signal at line(s) 159 to multiply the frequency of the external clock signal by three. Thus, a signal of 99 MHz is generated at line 158. Clock management unit 120 simultaneously sets divider circuit 124 such that the frequency of the input signal to divider circuit 124 is reduced by a divisor of two. Thus, a signal having a frequency of 49.5 MHz is generated at line 160. The clock management unit, upon assertion of the "locked" signal from phase locked loop circuit 122, enables the three-state driver 126 such that a timing signal having a frequency of 49.5 MHz is provided at line 112. Clock generator and distribution unit 106 correspondingly drives the PHI1 and PHI2 clock signals at a frequency of 49.5 MHz. This initial frequency is illustrated as frequency F1 within the thermal diagram of FIG. 2.

Subsequent operations of clock control circuit 101 depend upon assertions of the primary indicator signal by primary temperature indicator unit 130 and upon assertions of the auxiliary indicator signal by auxiliary temperature indicator unit 132.

As illustrated in FIG. 2, it will be assumed that the microprocessor 100 initiates operation at the initial operating point 210. At this point, the auxiliary indicator signal will be asserted and the primary indicator signal will be deasserted. Depending upon the particular operational parameters, the temperature of the semiconductor die forming the microprocessor 100 may decrease below the hysteresis level (i.e., temperature T3) associated with the auxiliary threshold temperature. When the temperature decreases below the hysteresis level at point 214, the auxiliary indicator signal will be deasserted by the auxiliary temperature indicator unit 132. In response, the clock management unit 120 causes the timing signal at line 112 to be increased to a frequency F2 as illustrated at point 216 of FIG. 2. The frequency F2 is illustrative of, for example, a frequency of 66 MHz. As stated previously, this may be achieved by controlling the phase locked loop circuit 122 such that the frequency of the external clock signal is multiplied by a factor of two, while controlling divider circuit 124 such it is associated with a divisor of one. It is noted that prior to changing the control signals to phase locked loop circuit 122 and divider circuit 124 to thereby modify the frequency of the timing signal line 112, the clock management unit 120 disables three-state buffer 126 and enable three-state buffer 128. Consequently, the phase locked loop 122 and divider circuit 124 are temporarily bypassed and the external clock signal at line 110 is provided directly to clock generator and distribution unit 106. The CPU core 102 is thus temporarily driven at the external clock frequency of 33 MHz until the locked signal is asserted by phase locked loop circuit 122, whereupon the clock management unit 120 enables three-state buffer 126 and disables three-state buffer 128. It is also noted that the switching in frequency of the timing signal at line 112 is synchronized with the external clock signal 110.

While operating at the increased frequency F2, the semiconductor die temperature may increase. If the semiconductor die temperature increases to the auxiliary threshold temperature as illustrated at point 218, the auxiliary indicator signal will be reasserted by auxiliary temperature indicator unit 132. The clock management unit responsively controls the phase locked loop circuit 122 and divider circuit 124 such that a timing signal of 49.5 MHz is again provided at line 112. It is noted that the phase locked loop circuit 122 is again temporarily bypassed by disabling three-state buffer 126 and enabling three-state buffer 128. This bypass operation thus ensures that the timing signal at line 112 remains stable while the phase locked loop circuit is unlocked.

While operating at the frequency F1, the semiconductor die temperature may increase above the initial operating point 210 to the primary threshold level T4 as illustrated at point 222. At this point, the primary indicator signal at line 150 will be asserted by the primary temperature indicator unit 130. The clock management unit 120 responsively causes the frequency of the timing signal at line 112 to decrease to a frequency F3. In this particular implementation, the frequency F3 is representative of 33 MHz. During the switching of the frequency of the phase locked loop circuit 122, the clock management unit again disables the three-state buffer 126 and enables the three-state buffer 128. Upon a locked indication by phase locked loop circuit 122, the three-state buffer 126 is again enabled and the three-state buffer 128 is disabled.

The frequency of the timing signal at line 112 will remain at the frequency F3 until the temperature of the semiconductor die decreases below the hysteresis level T5 as illustrated at point 226. When the temperature falls below the hysteresis level, the primary indicator signal will be deasserted by the primary temperature indicator unit 130. This causes the clock management unit to increase the frequency of the timing signal to the frequency F1. The clock management unit 120 dynamically controls the frequency of the timing signal 112 in this manner during the entire operation of microprocessor 100. Accordingly, the operating frequency of the microprocessor may be advantageously increased during favorable operating conditions, while failures due to overheating during less favorable operating conditions are presented.

It is noted that the primary temperature indicator unit 130 as well as the auxiliary temperature indicator unit 132 may each be implemented with a comparator including an associated hysteresis circuit for comparing the digital output signal from thermal sensor 134 to the associated programmed threshold value within programmable registers unit 136. In addition, it is noted that while the primary threshold level and auxiliary threshold level are programmable within the embodiment of FIG. 1, the primary and auxiliary threshold levels could alternatively be fixed parameters. It is finally noted that the external clock signal at line 110 may be derived from an external crystal oscillator circuit or may be derived from an on-chip signal source.

Numerous variations and modifications will become apparent to those skilled in the art once the above disclosure is fully appreciated. For example, although a phase locked loop circuit 122, a divider circuit 124, and three-state buffers 126 and 128 are employed within the embodiment of FIG. 1 to selectively vary the frequency of the timing signal at line 112, other frequency control circuits may be coupled to clock management unit 120 for selectively varying a frequency of the timing signal at line 112. For instance, frequency control circuit 168 could be implemented with a plurality of phase locked loop circuits, wherein each phase locked loop circuit generates a timing signal of a particular frequency. The output signal from each phase locked loop circuit could be selectively provided to line 112 via a multiplexer controlled by clock management unit 120. Similarly, although the phase locked loop circuit of FIG. 1 is a digital phase locked loop circuit, analog phase locked loop circuits could be alternatively be employed. It is intended that the following claims be interpreted to embrace all such variations and modifications.

What is claimed is:

1. A microprocessor comprising:
   a CPU core capable of executing a predetermined instruction set;
   a clock generator and distribution unit coupled to said CPU core, wherein said clock generator and distribution unit is configured to provide a CPU clock signal to said CPU core, and wherein a frequency of said CPU clock signal is dependent upon a frequency of a timing signal; and
   a clock control circuit coupled to said clock generator and distribution unit, wherein said clock control circuit includes:
   a frequency control circuit configured to selectively vary a frequency of said timing signal depending upon a control signal;
   a thermal sensor capable of providing a temperature signal indicative of a temperature associated with said microprocessor;
   a primary temperature indicator unit coupled to said thermal sensor, wherein said primary temperature indicator unit is capable of asserting a primary indicator signal if said temperature signal exceeds a first predetermined threshold level;
   an auxiliary temperature indicator unit coupled to said thermal sensor and capable of asserting an auxiliary indicator signal if said temperature signal exceeds a second predetermined threshold level; and
   a clock management unit coupled to receive said primary indicator signal and said auxiliary indicator signal, and coupled to said frequency control circuit, wherein said clock management unit is configured to vary said control signal to thereby cause a change in the frequency of said timing signal in response to assertions of said primary indicator signal and said auxiliary indicator signal.

2. The microprocessor as recited in claim 1 wherein said primary temperature indicator unit is associated with a hysteresis characteristic whereby, upon assertion of said primary indicator signal, said primary indicator signal remains asserted until said temperature signal has dropped below a first predetermined hysteresis point associated with said primary temperature indicator unit.

3. The microprocessor as recited in claim 2 wherein said auxiliary temperature indicator unit is associated with a hysteresis characteristic whereby, upon assertion of said auxiliary indicator signal, said auxiliary indicator signal remains asserted until said temperature signal has dropped below a second predetermined hysteresis point associated with said auxiliary temperature indicator unit.

4. The microprocessor as recited in claim 1 wherein said clock management unit is configured to control said frequency control circuit such that said timing signal is associated with a first predetermined frequency if said primary indicator signal and said auxiliary indicator signal are asserted, and such that said timing signal is associated with a second predetermined frequency if said auxiliary indicator signal is asserted while said primary indicator signal is deasserted, and such that said timing signal is associated with a third predetermined frequency if said auxiliary indicator signal is deasserted, wherein said first predetermined frequency is lower than said second predetermined frequency, and wherein said second predetermined frequency is lower than said third predetermined frequency.

5. The microprocessor as recited in claim 1 wherein said frequency control circuit includes a phase locked loop circuit coupled to said clock management unit.

6. The microprocessor as recited in claim 5 wherein said phase locked loop circuit generates an output signal which is associated with a predetermined factor of a frequency of an external clock signal provided to said phase locked loop circuit, wherein said timing signal is derived from said output signal.

7. The microprocessor as recited in claim 6 further comprising a divider circuit for receiving said output signal of said phase locked loop circuit and for deriving said timing signal.

8. The microprocessor as recited in claim 1 further comprising a programmable registers unit coupled to said primary temperature indicator unit and to said auxiliary temperature indicator unit, wherein said programmable registers unit is capable of storing said first and second predetermined threshold levels.

9. The microprocessor as recited in claim 8 further comprising a bus coupled to said CPU core and to said programmable registers unit wherein said programmable registers unit may be written via said bus.

10. The microprocessor as recited in claim 1 wherein said temperature signal provided from said thermal sensor is indicative of a temperature of a semiconductor die on which said microprocessor is fabricated.

11. A clock control circuit for providing a timing signal that controls an internal clock frequency of a microprocessor, said clock control circuit comprising:
   a frequency control circuit configured to selectively vary a frequency of said timing signal depending upon a control signal;
   a thermal sensor capable of providing a temperature signal indicative of a temperature associated with the said microprocessor;
   a primary temperature indicator unit coupled to said thermal sensor, wherein said primary temperature indicator unit is capable of asserting a primary indicator signal if said temperature signal exceeds a first predetermined threshold level;
   an auxiliary temperature indicator unit coupled to said thermal sensor and capable of asserting an auxiliary indicator signal if said temperature signal exceeds a second predetermined threshold level; and
   a clock management unit coupled to receive said primary indicator signal and said auxiliary indicator signal, and coupled to said frequency control circuit, wherein said clock management unit is configured to vary said control signal to thereby cause a change in the frequency of said timing signal in response to assertions of said primary indicator signal and said auxiliary indicator signal.

12. The clock control circuit as recited in claim 11 wherein said primary temperature indicator unit is associated with a hysteresis characteristic whereby, upon assertion of said primary indicator signal, said primary indicator signal remains asserted until said temperature signal has dropped below a first predetermined hysteresis point associated with said primary temperature indicator unit.

13. The clock control circuit as recited in claim 12 wherein said auxiliary temperature indicator unit is associated with a hysteresis characteristic whereby, upon assertion of said auxiliary indicator signal, said auxiliary indicator signal remains asserted until said temperature signal has dropped below a second predetermined hysteresis point associated with said auxiliary temperature indicator unit.

14. The clock control circuit as recited in claim 11 wherein said clock management unit is configured to control said frequency control circuit such that said timing signal is associated with a first predetermined frequency if said primary indicator signal and said auxiliary indicator signal are asserted, and such that said timing signal is associated with a second predetermined frequency if said auxiliary indicator signal is asserted while said primary indicator signal is deasserted, and such that said timing signal is associated with a third predetermined frequency if said auxiliary indicator signal is deasserted, wherein said first predetermined frequency is lower than said second predetermined frequency, and wherein said second predetermined frequency is lower than said third predetermined frequency.

15. The clock control circuit as recited in claim 11 wherein said frequency control circuit includes a phase locked loop circuit coupled to said clock management unit.

16. The clock control circuit as recited in claim 15 wherein said phase locked loop circuit generates an output signal which is associated with a predetermined factor of a frequency of an external clock signal provided to said phase locked loop circuit, wherein said timing signal is derived from said output signal.

17. The clock control circuit as recited in claim 16 further comprising a divider circuit for receiving said output signal of said phase locked loop circuit and deriving said timing signal.

18. A method for controlling a frequency of an internal clock signal which drives a microprocessor comprising the steps of:

generating a temperature signal indicative of a temperature associated with said microprocessor;

comparing said temperature signal with a first predetermined threshold level;

asserting a primary indicator signal if said temperature signal exceeds said first predetermined threshold level;

comparing said temperature signal with a second predetermined threshold level;

asserting an auxiliary indicator signal if said temperature signal exceeds said second predetermined threshold level;

decreasing a frequency of said internal clock signal if said primary indicator signal is asserted; and increasing said frequency of said internal clock signal if neither said primary indicator signal nor said auxiliary indicator signal are asserted.

19. The method for controlling a frequency of an internal clock signal as recited in claim 18 comprising the further step of programming said first predetermined threshold level and said second predetermined threshold level within a programmable registers unit.

20. The method for controlling a frequency of an internal clock signal as recited in claim 18 comprising the further step of driving said internal clock signal at an intermediate frequency if said auxiliary indicator signal is asserted and said primary indicator signal is deasserted.

* * * * *